(No Model.)
W. DÜRR.
DEVICE FOR MEASURING THE DENSITY OF GASES.
No. 494,192. Patented Mar. 28, 1893.
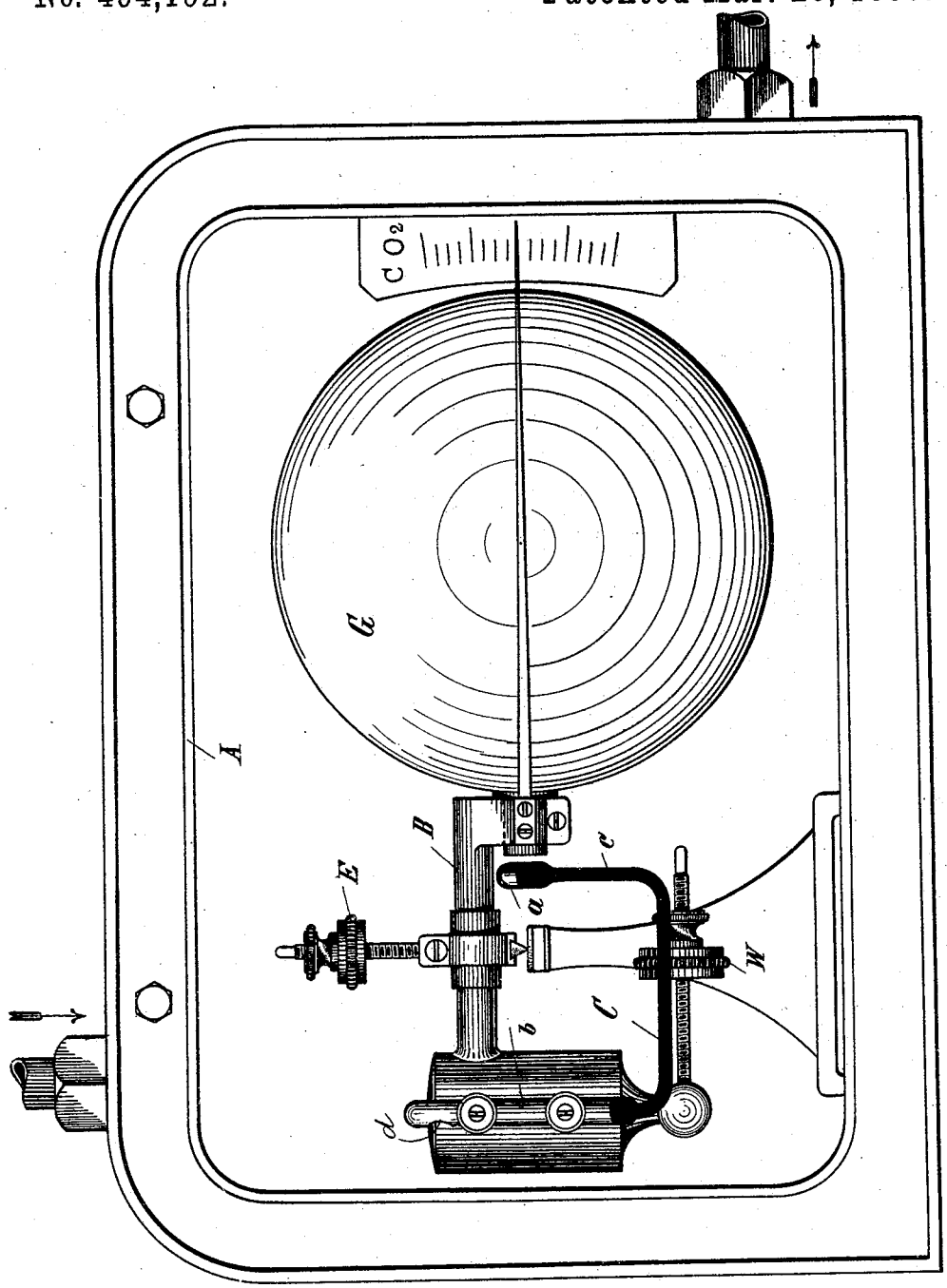
Witnesses:
A. J. Schwartz
E. B. Clark
Inventor:
Walther Dürr
By Max Bengü
his Atty.

UNITED STATES PATENT OFFICE.

WALTHER DÜRR, OF MUNICH, GERMANY.

DEVICE FOR MEASURING THE DENSITY OF GASES.

SPECIFICATION forming part of Letters Patent No. 494,192, dated March 28, 1893.

Application filed August 11, 1892. Serial No. 442,817. (No model.) Patented in England September 24, 1887, No. 12,963; in Belgium September 30, 1887, No. 78,922; in France December 24, 1887, No. 185,936; in Germany February 29, 1888, No. 42,639, and in Austria-Hungary October 13, 1888, No. 13,388 and No. 31,393.

*To all whom it may concern:*

Be it known that I, WALTHER DÜRR, a citizen of the Kingdom of Bavaria, residing at Munich, Bavaria, Germany, have invented certain new and useful Improvements in Devices for Measuring the Density of Gases, (which has been patented in Germany February 29, 1888, No. 42,639; in Belgium September 30, 1887, No. 78,922; in Austria-Hungary October 13, 1888, No. 13,388 and No. 31,393; in England September 24, 1887, No. 12,963, and in France December 24, 1887, No. 185,936,) of which the following is a specification.

The apparatus embodying my invention consists in a fine scale whose beam carries at its end a hollow and light glass globe. Its weight is balanced at the other end of the scale-beam by a counterweight.

The drawing represents a front elevation of such apparatus.

The whole is inclosed in a case, A, of suitable size hermetically sealed and provided with a glass window, through which case the gases to be combined are conducted. According to the density of the gases introduced the globe and pointer attached thereto will rise or fall, whereby one is enabled to take observations upon a suitably divided scale. In the form so far described, the apparatus would, however be identical with the dasymeter, originated by Otto von Guericke, which, as is well known can never give an accurate measurement (at least without complicated correcting computations) on account of the disturbing influences of changes in temperature and atmospheric pressure. In order to eliminate these disturbing influences at the start, the hereinafter described compensator is under my invention applied at a suitable point of the scale-beam.

The glass tube, $a$, $b$, $c$, $d$, U-shaped or bent at a suitable angle, is hermetically closed at $a$, and open or provided with an orifice at $d$. Its lower portion from $b$ to $c$, is filled with a sealing liquid (mercury and sulphuric acid or the like), whereby an accurately determined quantity of dry air is confined in $a$. The parts are so arranged that the center of gravity of the column of mercury lies approximately in a vertical line, subtended from the knife-edge-support of the scale. As soon as the temperature or the atmospheric pressure or both change, the volume of the air inclosed in $a, b$, changes according to well known physical laws, thereby shifting the center of gravity of the liquid.

The operation of the apparatus is as follows: If the pointer of the aerostatic balance is at a certain point of the scale or index, at a certain temperature and height of the barometer, the said pointer will rise upwardly with the globe upon the introduction into case, A, of gas produced by combustion which, as is well known, is heavier on account of the presence of carbonic acid, and hence exerts a greater buoyant action upon the glass-globe. The specific gravity and hence the percentage of carbonic acid of the gaseous mixture introduced, may therefore be easily ascertained from the magnitude of deviation of the pointer. Now, if for example, the gaseous mixture introduced has a higher temperature, an error in reading off would arise, in consequence of a change of density, resulting in an undue sinking of the globe. This error is eliminated, however, by virtue of the expansion of the air confined in the U-shaped tube, due to the rise of temperature, caused by the introduced gaseous mixture whereby the column of mercury is forced forward in the tube $b$, thereby shifting the center of gravity to the left. If the height of barometer changes and rises, for example, the density of the gas and hence, its buoyant force is increased. The error in reading off resulting therefrom is eliminated, however, by the shifting of the mercury column to the limb $c$, &c. Thus, to resume: When gas introduced in the apparatus to be measured is heated above the predetermined temperature for which the described apparatus will accurately measure the density, an error in reading off would arise due to the fact that the globe, G, is not buoyed up sufficiently. This error in reading off is, however, eliminated by reason of the fact that the heat of the gas to be measured will also cause the body of air, in the compensator at $a$, to expand whereby the column of mercury and with it the center of gravity is shifted toward the limb, $b$. A rise of barometer above that at which the apparatus would accurately measure (because the globe, G, would be raised too much), will also cause an error in reading of which however, is also eliminated by the compensator by reason of the fact that the gas introduced under the increased pressure, will bear upon the column of mercury and shift it and its center of gravity toward the limb, $c$, thereby causing the globe, G, to sink exactly to the extent which the increased barometric pressure would cause it to rise.

For a lower temperature or barometric pressure, than the normal, the center of gravity of the compensator would be shifted in a direction contrary to those just stated.

From the above example it is evident, that by employing this compensator one is enabled to accurately determine the composition of gases of combustion, gaseous mixtures, &c., by the aid of Guericke's aerostatic balance, without tedious correcting calculations. For the said compensator effects such an equalization that the instrument is adapted to indicate the weight of the gaseous mixtures to be examined under normal conditions.

The equilibrium of the balance is regulated by an adjustable weight, W, suitably applied to the smaller arm of the balance and the sensitiveness of the same by a weight, E, adjustably applied over the knive-edge support.

I claim—

1. In a dasymeter, the combination with a scale-beam, of a bent compensating tube, secured thereto, one of whose limbs $c$ has a body of air confined therein by a sealing liquid, such as mercury, sulphuric acid or the like, while the other limb is open, whereby the center of gravity of the liquid is shifted by variations in the volume of the confined body of air, due to variations in atmospheric pressure or temperature, and whereby the disturbing influence, acting in a contrary sense on the dasymeter, is eliminated, substantially as set forth.

2. In a dasymeter, the combination with a scale-beam having a knife-edge support or fulcrum, of a bent compensating tube attached to one of the arms of the scale-beam and having a column of air confined in one limb by a suitable sealing liquid under normal conditions, while the other limb is open, the center of gravity of the sealing liquid being approximately on a vertical line drawn from the knife-edge support of the scale-beam, substantially as set forth.

In testimony that I claim the foregoing as my invention I have signed my name in presence of two subscribing witnesses.

WALTHER DÜRR.

Witnesses:
ALBERT WEICKMANN,
CARL MAYER.